(12) United States Patent
Tsubakino et al.

(10) Patent No.: US 8,141,451 B2
(45) Date of Patent: Mar. 27, 2012

(54) SHIFT DRIVE DEVICE

(75) Inventors: Yukihiro Tsubakino, Saitama (JP); Akira Tokito, Saitama (JP); Akio Senda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 499 days.

(21) Appl. No.: 12/395,010

(22) Filed: Feb. 27, 2009

(65) Prior Publication Data

US 2009/0241716 A1 Oct. 1, 2009

(30) Foreign Application Priority Data

Mar. 31, 2008 (JP) ................................. 2008-092877

(51) Int. Cl.
*B60K 20/00* (2006.01)
*F16H 59/04* (2006.01)
*G05G 9/00* (2006.01)

(52) U.S. Cl. .................................. 74/473.36; 74/473.1

(58) Field of Classification Search ................. 74/473.1, 74/473.12, 473.3, 473.36, 473.37
See application file for complete search history.

(56) References Cited

U.S. PATENT DOCUMENTS

| 4,754,662 A * | 7/1988 | Misawa ..................... 74/473.22 |
| 7,832,303 B2 * | 11/2010 | Kwon ........................ 74/473.24 |
| 2008/0081725 A1 * | 4/2008 | Sotani et al. .................. 475/209 |

FOREIGN PATENT DOCUMENTS

JP 6-117533 A 4/1994

* cited by examiner

*Primary Examiner* — Justin Krause
(74) *Attorney, Agent, or Firm* — Birch, Stewart, Kolasch & BIrch, LLP

(57) ABSTRACT

A shift drive device with a shift arm having one end secured to a shift spindle with a guide hole for receiving a pin, provide to project therefrom, inserted therethrough and engaged therewith. A turn-restriction hole receives a restriction pin provided on a transmission case. A space that is needed for turning the shift arm is reduced. A turn-restriction hole is provided in a shift arm so as to be disposed on a straight line connecting an axial line of a shift spindle with the center of a guide hole.

20 Claims, 2 Drawing Sheets

SHIFT DRIVE DEVICE

CROSS-REFERENCE TO RELATED APPLICATIONS

The present application claims priority under 35 USC 119 to Japanese Patent Application No. 2008-092877 filed on Mar. 31, 2008 the entire contents of which are hereby incorporated by reference.

BACKGROUND OF THE INVENTION

1. Field of the Invention

The present invention relates to a shift drive device in which a drum shifter turning around the same axis as that of a shift drum to turnably drive the shift drum is provided with a pin projecting therefrom and located offset from the turning axis. A shift arm includes one end that is secured to a shift spindle turnably secured by a transmission case. A guide hole is formed like an elongate hole lengthwise and extends in a radial direction of the shift spindle and is adapted to receive the pin inserted therethrough and engaged therewith. A turn-restriction hole is adapted to receive a restriction pin provided in the transmission case inserted therethrough. The pin is moved in the guide hole in response to the turn of the shift arm along with the shift spindle to turn the drum shifter and, to bring the restriction pin into abutment against a lateral edge of the turn-restriction hole, thereby restricting a turning range of the shift spindle and of the shift arm.

2. Description of Background Art

There is known a shift drive device in which a shift arm is secured to a shift spindle and is formed in a general L-shape to have a pair of arm portions extending from the shift spindle perpendicularly to each other. One of the arm portions is provided with a guide hole adapted to receive a pin of a drum shifter inserted thereinto and engaged therewith. The other arm portion is provided with a turn-restriction hole adapted to engage with a restriction pin of a transmission case to restrict the turning range of the shift spindle and of the shift arm. See, for example, Japanese Patent Laid-Open No. Hei 6-117533.

However, since the shift arm disclosed in Japanese Patent Laid-Open No. Hei 6-117533 is formed in a general L-shape, a space needed to turn the shift arm therein is increased to decrease the flexibility of the arrangement of other parts in the vicinity of the shift arm.

SUMMARY AND OBJECTS OF THE INVENTION

It is an object of an embodiment of the present invention to provide a shift drive device that can reduce a space needed to turn a shift arm.

To achieve the above object, a shift drive device in which a drum shifter is provided that turns around the same axis as an axis of a shift drum to turnably drive the shift drum. A pin projects therefrom and is located offset from the turning axis. A shift arm includes one end that is secured to a shift spindle turnably secured by a transmission case with a guide hole formed like an elongate hole lengthwise and extending in a radial direction of the shift spindle and is adapted to receive the pin inserted therethrough and engaged therewith. A turn-restriction hole is adapted to receive a restriction pin that is inserted therethrough in the transmission case. The pin is moved in the guide hole in response to the turn of the shift arm along with the shift spindle to turn the drum shifter and, to bring the restriction pin into abutment against a lateral edge of the turn-restriction hole, thereby restricting a turning range of the shift spindle and of the shift arm. The turn-restriction hole is disposed on a straight line connecting an axial line of the shift spindle with the center of the guide hole.

According to an embodiment of the present invention, a pole ratchet mechanism is provided between a shift drum center coaxially secured to the shift drum and the drum shifter. A gripping spring surrounding the shift spindle is provided with a pair of gripping arms disposed on both respective sides of the restriction pin and abutted against the shift arm from both circumferential sides of the shift spindle so as to bias the shift spindle and the shift arm to a neutral position. The straight line is disposed between respective abutment portions of both the gripping arms against the shift arm located at the neutral position.

According to an embodiment of the present invention, a stopper arm, selectively and elastically engaged with a plurality of positioning notches provided on the outer circumference of the shift drum center, is disposed in an area placed between two respective straight lines passing the axial line of the shift spindle and the outer circumference of the shift drum and is swingably supported by a spindle provided on the transmission case.

According to an embodiment of the present invention, the turn-restriction hole engaged with the restriction pin, adapted to restrict the turning range of the shift arm, is disposed on the straight line connecting the axial line of the shift spindle with the center of the guide hole. Therefore, the shift arm whose one end is secured to the shift spindle needs to be formed to extend in the radial direction of the shift spindle with the guide hole provided on the other end side. Thus, a space needed for turning of the shift arm can be reduced to thereby increase the flexibility of the arrangement of the other parts in the vicinity of the shift arm.

According to an embodiment of the present invention, the pair of gripping arms, provided for the gripping spring biasing the shift arm to the neutral position, are abutted against the shift arm from both the circumferential sides of the shift spindle. The straight line connecting the axial line of the shift spindle with the center of the guide hole is disposed between respective abutment portions of both the gripping arms against the shift arm located at the neutral position. Therefore, also when the shift spindle is turned to upshift or downshift, the generally equal spring force can be applied to the shift arm from the gripping arms at almost the same position intermediate between the shift spindle and the pin. In addition, also when the shift spindle is turned to any side, the pin is moved to the shift spindle side in the guide hole. Thus, the operational feelings of upshift and of downshift can be made almost the same.

According to an embodiment of the present invention, the spindle turnably supporting the stopper arm is disposed in the area put between the two respective straight lines passing the axial line of the shift spindle and the outer circumference of the shift drum as viewed from the axial direction of the shift spindle. Thus, the shift drive device provided with the stopper arm can be configured compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings.

Figure 1:
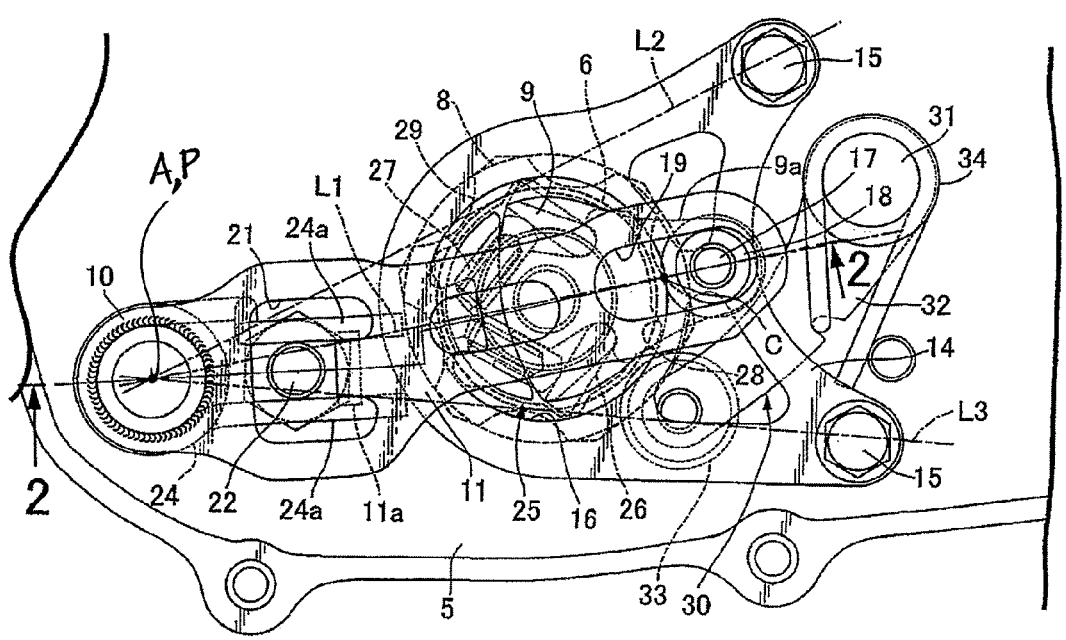
FIG. 1 is a longitudinally cross-sectional lateral view of a shift drive device, taken along line 1-1 of FIG. 2.
Figure 2:
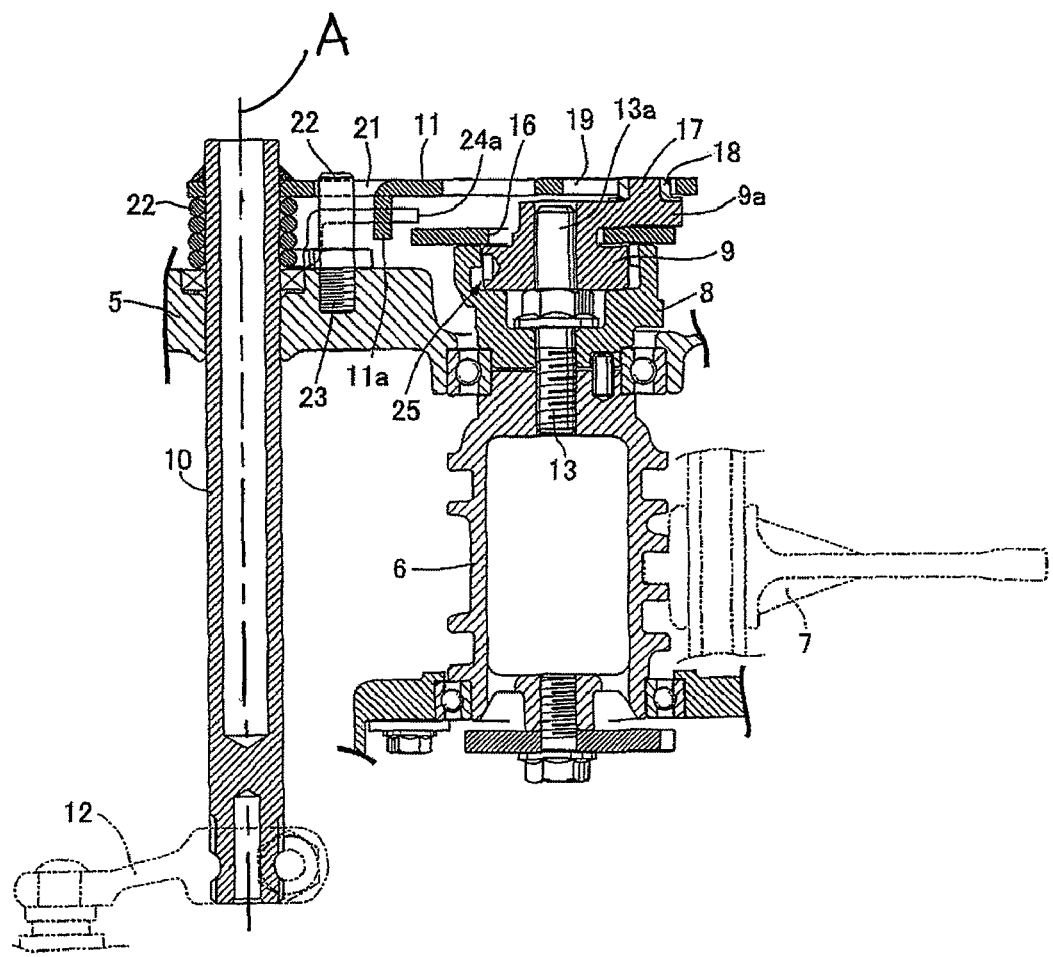
FIG. 2 is a view as viewed from arrow 2 of FIG. 1.

As illustrated in FIGS. 1 and 2, a transmission case 5 turnably carries a shift drum 6 forming part of a transmission. A shift fork 7 is engaged with the outer circumference of the shift drum 6 so as to be moved in a direction parallel to an axis of the shift drum 6 by the turning of the shift drum 6. The shift fork 7 selectively switches established gear trains of a plurality of speed-change steps included in a gear speed-change mechanism not shown.

A shift drum center 8 is coaxially secured to one end of the shift drum 6. The shift drum 6 and the shift drum center 8 are intermittently turnably driven by a predetermined angle by a shift drive device according to an embodiment of the present invention. This shift drive device includes a drum shifter 9, a shift spindle 10 and a shift arm 11. The drum shifter 9 is partially disposed inside the shift drum center 8 so as to be able to turn around an axis coaxial with the shift drum center 8. The shift spindle 10 is turnably journaled by the transmission case 5 so as to be turnable around an axis parallel to the shift drum 6. The shift arm 11 has one end secured to one end of the shift spindle 10 and the other end portion with which a pin 17 is insertably engaged, the pin 17 being provided on the drum shifter 9 to project therefrom.

A lever 12 is secured to the other end side of the shift spindle 10. A turning force by manual operation or by the operation of an armature of an electric motor or the like is applied to the shift spindle 10 via the lever 12. Thus, the shift arm 11 is turned together with the shift spindle 10 to turnably drive the drum shifter 9, which turns the shift drum 6.

The shift drum center 8 is formed like a bottomed, stepped cylinder whose end closer to the shift drum 6 is closed. A bolt 13 is coaxially secured to one end of the shift drum 6. A side plate 14 is secured with a plurality of bolts 15 to the transmission case 5 so as to put the shift drum center 8 between the transmission case 5 and the side plate 14. The drum shifter 9, partially disposed inside the shift drum center 8, is turnably supported by a shaft portion 13a coaxially continuous with the bolt 13 which coaxially secures the shift drum center 8 to the shift drum 6. Thus, the drum shifter 9 can relatively turn around an axis coaxial with the shift drum center 8.

The side plate 14 is provided with a generally circular opening portion 16 formed to correspond to the drum shifter 9. Since a portion of the outer circumference of the drum shifter 9 is covered by a lip portion of the opening portion 16, the drum shifter 9 can be prevented from disengaging from the shift drum center 8. In addition, the drum shifter 9 is integrally provided with a protruding arm portion 9a protruding from the opening portion 16 toward the external surface side of the side plate 14. The pin 17, disposed at a position offset from the turning axis of the drum shifter 9, i.e., from the turning axis of the shift drum 6 and of the shift drum center 8, is integrally provided to project from the protruding arm portion 9a toward the side opposite to the side plate 14.

One end of the shift arm 11 is secured to one end of the shift spindle 10 by welding or the like. The shift arm 11 is formed to linearly extend from the shift spindle 10 along the radial direction of the shift spindle 10. In addition, the shift arm 11 is provided on the other end side with a guide hole 19 adapted to receive the pin 17 inserted thereinto and engaged therewith. This guide hole 19 is formed like an elongate hole longwise extending in the radial direction of the shift spindle 10. A roller 18 is turnably attached to the pin 17 so as to be in roll contact with both lateral edges of the guide hole 19.

The shift arm 11 is provided with a generally rectangular turn-restriction hole 21 between the guide hole 19 and the shift spindle 10. A restriction pin 22 provided on the transmission case 5 is inserted through the turn-restriction hole 21. The restriction pin 22 is provided integrally with and coaxially with a bolt 23 screwed to the transmission case 5. The restriction pin 22 comes into abutment against the lateral edges of the turn-restriction pin 22 on both sides in a circumferential direction around the axis of the shift spindle, of lateral edges of the turn-restriction hole 21. Thus, the turning range of the shift arm 11 and of the shift spindle 10 is restricted. In addition, the turn-restriction hole 21 is disposed on a straight line L1 connecting the axis of the shift spindle 10 with the center C of the guide hole 19.

A projecting portion 11a projecting toward the transmission case 5 from a lateral edge on the side opposite to the shift spindle 10, of the lateral edges of the turn-restriction hole 21 is provided integrally with the shift arm 11 so as to project therefrom. A gripping spring 24 is disposed between the shift arm 11 and the transmission case 5 so as to surround the shift spindle 10. This gripping spring 24 is provided at both ends with a pair of gripping arms 24a, 24a gripping the projecting portion 11 and the restriction pin 22 from both the circumferential sides of the shift spindle 10. Thus, the shift spindle 10 and the shift arm 11 are biased to a neutral position by the gripping spring 24. At this neutral position, the straight line L1 connecting the axial line of the shift spindle 10 with the center of the guide hole 19 is disposed between the abutment portions of both gripping arms 24a, 24a to the projecting portion 11a of the shift arm 11.

A pole ratchet mechanism 25 is provided between the shift drum center 8 and the drum shifter 9. The pole ratchet mechanism 25 includes a pair of poles 26, a pair of springs 27 and engaging recessed portions 28. The pair of poles 26 are symmetrically attached to the drum shifter 9 so as to raise and fall in the radial direction of the shift drum center 8. The pair of springs 27 bias the corresponding poles 26 in the raising direction; and engaging recessed portions 28 provided at circumferentially equal intervals on the inner circumference of the shift drum center 8 so as to be brought into engagement with both the corresponding poles 26. The drum shifter 9 is turned relatively to the shift drum center 8, whereby any one of both the poles 26 is selectively engaged with a corresponding one of the engaging recessed portions 28. This turnably drives the shift drum center 8 and the shift drum 6.

The shift drum center 8 is provided on its outer circumference with a plurality of arcuately recessed positioning notches 29 circumferentially equally spaced apart from each other so as to correspond to a plurality of shift positions set on the shift drum 6. A stopper arm 30 is selectively engaged with the positioning notches 29. The stopper arm 30 includes an arm 32 and a roller 33. The arm 32 is supported at its proximal end by the transmission case 5 for turning around a spindle 31 having an axis parallel to the axis of the shift drum 6 and of the shift drum center 8. The roller 33 is turnably supported by the end of the arm 32 so as to be engaged with one of the positioning notches 29.

A torsion spring 34 is provided between the proximal end of the arm 32 and the transmission case 5. The arm 32, i.e., the drum stopper arm 30 is biased by spring force exerted by the torsion spring 34 toward the turning center of the shift drum center 8 so as to bring the roller 33 into engagement with one of the position notches 29.

In addition, the spindle 31 turnably supporting the stopper arm 30 is disposed in an area put between two respective straight lines L2, L3 passing through the axis of the shift spindle 10 and the outer circumference of the shift drum 6 as viewed from the axial direction of the shift spindle 10.

With respect to the operation of the embodiment, the shift arm 11 is provided with the turning-restriction hole 21 adapted to receive the restriction pin 22 inserted therethrough in order to restrict the turning range of the shift arm 11, the restriction pin 22 is provided on the transmission case 5. In this case, the turning-restriction hole 21 is provided in the shift arm 11 so as to be disposed on the straight line L1 connecting the axial line of the shift spindle 10 to which one end of the shift arm 11 is secured, with the center of the elongate guide hole 19 provided on the other end side of the shift arm 11. Therefore, the shift arm 11 whose one end is secured to the shift spindle 10 needs only to be formed to extend in the radial direction of the shift spindle 10 in such a manner that the guide hole 19 is provided on the other end side. Thus, a space needed for turning of the shift arm 11 can be reduced in size so as to thereby increase flexibility of arranging other parts near the shift arm 11.

In addition, the pole ratchet mechanism 25 is provided between the shift drum center 8 coaxially secured to the shift drum 6 and the drum shifter 9. The gripping spring 24 surrounding the shift spindle 10 is provided with the pair of griping arms 24a, 24a disposed on both respective sides of the restriction pin 22 and abutted against the projecting portion 11a of the shift arm 11 from both the circumferential sides of the shift spindle 10 so as to bias the shift spindle 10 and the shift arm 11 toward the neutral position. The straight line L1 is disposed between the abutment portions of both the gripping arms 24a, 24a to the shift arm 11 located at the neutral position. Also when the shift spindle 10 is turned to upshift or downshift, generally equal spring force can be applied to the shift arm 11 from the gripping arms 24a at almost the same position intermediate between the shift spindle 10 and the pin 17. In addition, when the shift spindle 10 is turned to any side, the pin 17 is moved toward the shift spindle 10 and inside the guide hole 19. Thus, the operational feeling of upshift and of downshift can be made almost the same.

Further, the stopper arm 30, selectively and elastically engaged with the plurality of positioning notches 29 provided in the outer circumference of the shift drum center 8, is swingably supported by the spindle 31 disposed in the area located between the two straight lines L2, L2 passing through a point P on the axial line A of the shift spindle 10 and the outer circumference of the shift drum 6 as viewed from the axial direction of the shift spindle 10 and provided on the transmission case 5. Thus, the shift drive device provided with the stopper arm 30 can be configured to be compact.

The present embodiment of the invention has been described thus far but the invention is not limited to this embodiment. Design can be modified in various way not departing from the invention recited in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift drive device comprising:
   a drum shifter turning around the same axis as an axis of a shift drum to turnably drive the shift drum;
   a pin projecting from the drum shifter and located offset from the turning axis;
   a shift arm includes one end secured to a shift spindle turnably secured by a transmission case, said shift arm includes a guide hole formed as an elongate hole lengthwise and extending in a radial direction of the shift spindle and adapted to receive the pin inserted therethrough and engaged therewith, and with a turn-restriction hole adapted to receive a restriction pin inserted therethrough provided in the transmission case; and
   the pin is movable in the guide hole in response to the turn of the shift arm along with the shift spindle to turn the drum shifter and, to bring the restriction pin into abutment against a lateral edge of the turn-restriction hole, thereby restricting a turning range of the shift spindle and of the shift arm;
   wherein the turn-restriction hole is provided in the shift arm so as to be disposed on a straight line connecting an axial line of the shift spindle with the center of the guide hole.

2. The shift drive device according to claim 1, wherein a stopper arm selectively and elastically engaged with a plurality of positioning notches provided on an outer circumference of a shift drum center is disposed in an area between two respective straight lines passing through a point on an axial line of the shift spindle and an outer circumference of the shift drum and is swingably supported by a spindle provided on the transmission case.

3. The shift drive device according to claim 1, wherein a pole ratchet mechanism is provided between a shift drum center coaxially secured to the shift drum and the drum shifter,
   a gripping spring surrounding the shift spindle is provided with a pair of gripping arms disposed on both respective sides of the restriction pin and abutted against the shift arm from both circumferential sides of the shift spindle so as to bias the shift spindle and the shift arm to a neutral position, and
   the straight line is disposed between respective abutment portions of both the gripping arms against the shift arm located at the neutral position.

4. The shift drive device according to claim 3, wherein a stopper arm selectively and elastically engaged with a plurality of positioning notches provided on an outer circumference of the shift drum center is disposed in an area between two respective straight lines passing through a point on an axial line of the shift spindle and an outer circumference of the shift drum and is swingably supported by a spindle provided on the transmission case.

5. The shift drive device according to claim 1, wherein a shift drum center is coaxially secured to one end of the shift drum wherein the shift drum and the shift drum center are intermittently turnably driven by a predetermined angle by a shift drive device.

6. The shift drive device according to claim 5, wherein the drum shifter is partially disposed within the shift drum center to be turnable around an axis coaxially with the shift drum center.

7. The shift drive device according to claim 1, and further including a lever secured to a distal end of the shift spindle wherein impartment movement to the lever rotates the shift spindle to turnably drive the drum shifter for turning the shift drum.

8. The shift drive device according to claim 1, wherein the shift drum center is formed with a bottom and stepped cylinder sides with an end closer to the shift drum being closed and further including a connector being coaxially arranged to secure one end of the shift drum to the shift drum center.

9. The shift drive device according to claim 1, and further including a side plate secured to the transmission case for positioning the shift drum center between the transmission case and the side plate.

10. The shift drive device according to claim 9, wherein the side plate includes a generally circular opening portion formed to correspond to the drum shifter with a portion of an outer circumference of the drum shifter being covered by a lip portion of the generally circular opening portion.

11. A shift drive device comprising:
a shift drum having an axis;
a drum shifter turnable about the same axis as the axis of the shift drum to turnably drive the shift drum;
a pin upwardly projecting from the drum shifter and located offset from the turning axis;
a transmission case;
a shift spindle turnably mounted relative to the transmission case;
a shift arm having one end secured to the shift spindle turnably secured by the transmission case, said shift arm includes an elongated guide hole formed lengthwise and extending in a radial direction of the shift spindle and adapted to receive the pin inserted therethrough and engaged therewith;
a turn-restriction hole adapted to receive a restriction pin inserted therethrough provided in the transmission case; and
the pin is movable in the guide hole in response to the turn of the shift arm along with the shift spindle to turn the drum shifter and, to bring the restriction pin into abutment against a lateral edge of the turn-restriction hole, thereby restricting a turning range of the shift spindle and of the shift arm;
wherein the turn-restriction hole is provided in the shift arm so as to be disposed on a straight line connecting an axial line of the shift spindle with the center of the guide hole.

12. The shift drive device according to claim 11, wherein a stopper arm selectively and elastically engaged with a plurality of positioning notches provided on the outer circumference of a shift drum center is disposed in an area between two respective straight lines passing through a point on an axial line of the shift spindle and the outer circumference of the shift drum and is swingably supported by a spindle provided on the transmission case.

13. The shift drive device according to claim 11, wherein a pole ratchet mechanism is provided between a shift drum center coaxially secured to the shift drum and the drum shifter,
a gripping spring surrounding the shift spindle is provided with a pair of gripping arms disposed on both respective sides of the restriction pin and abutted against the shift arm from both circumferential sides of the shift spindle so as to bias the shift spindle and the shift arm to a neutral position, and
the straight line is disposed between respective abutment portions of both the gripping arms against the shift arm located at the neutral position.

14. The shift drive device according to claim 13, wherein a stopper arm selectively and elastically engaged with a plurality of positioning notches provided on an outer circumference of the shift drum center is disposed in an area between two respective straight lines passing through a point on an axial line of the shift spindle and the outer circumference of the shift drum and is swingably supported by a spindle provided on the transmission case.

15. The shift drive device according to claim 11, wherein a shift drum center is coaxially secured to one end of the shift drum wherein the shift drum and the shift drum center are intermittently turnably driven by a predetermined angle by a shift drive device.

16. The shift drive device according to claim 15, wherein the drum shifter is partially disposed within the shift drum center to be turnable around an axis coaxially with the shift drum center.

17. The shift drive device according to claim 11, and further including a lever secured to a distal end of the shift spindle wherein impartment movement to the lever rotates the shift spindle to turnably drive the drum shifter for turning the shift drum.

18. The shift drive device according to claim 11, wherein the shift drum center is formed with a bottom and stepped cylinder sides with an end closer to the shift drum being closed and further including a connector being coaxially arranged to secure one end of the shift drum to the shift drum center.

19. The shift drive device according to claim 11, and further including a side plate secured to the transmission case for positioning the shift drum center between the transmission case and the side plate.

20. The shift drive device according to claim 19, wherein the side plate includes a generally circular opening portion formed to correspond to the drum shifter with a portion of an outer circumference of the drum shifter being covered by a lip portion of the generally circular opening portion.

* * * * *